United States Patent
Zhang et al.

(10) Patent No.: US 12,032,079 B1
(45) Date of Patent: Jul. 9, 2024

(54) OPTICAL DETECTOR SYSTEM WITH MULTIPLE PATH LENGTHS

(71) Applicant: AMAZON TECHNOLOGIES, INC., Seattle, WA (US)

(72) Inventors: Rui Zhang, Sammamish, WA (US); Jeff Clark Adams, Seattle, WA (US); Markus Stefan Duelli, Seattle, WA (US); Donald Mitchell Cornwell, Bellevue, WA (US); Prafulla Masalkar, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 737 days.

(21) Appl. No.: 17/114,923

(22) Filed: Dec. 8, 2020

(51) Int. Cl.
G01S 3/78 (2006.01)
G01S 3/785 (2006.01)
G01S 3/789 (2006.01)
H04B 10/40 (2013.01)

(52) U.S. Cl.
CPC .............. *G01S 3/785* (2013.01); *G01S 3/789* (2013.01); *H04B 10/40* (2013.01)

(58) Field of Classification Search
CPC .......... G01S 3/785; G01S 3/789; H04B 10/40
See application file for complete search history.

(56) References Cited

U.S. PATENT DOCUMENTS

| 4,531,197 A | * | 7/1985 | Lin ........................ G06E 3/005 708/821 |
| 2006/0072425 A1 | * | 4/2006 | Hanks ................ G11B 7/24088 369/112.01 |
| 2019/0025053 A1 | * | 1/2019 | Slotwinski .............. G01S 17/89 |

FOREIGN PATENT DOCUMENTS

JP 4595212 B2 * 12/2010 ............. G01S 17/42

OTHER PUBLICATIONS

"12.7mm Dia. 1064nm λ/4 Quartz Waveplate Zero Order", Edmund Optics Worldwide, 2020, 3 pgs. Retrieved from the Internet: URL: https://www.edmundoptics.com/p/127mm-dia-1064nm-lambda4-quartz-waveplate-zero-order/28009/.

(Continued)

*Primary Examiner* — Jamil Ahmed
(74) *Attorney, Agent, or Firm* — Lindauer Law, PLLC

(57) ABSTRACT

An optical detector system provides positioning data to facilitate tracking in optical communications. The system provides first and second path lengths to direct light onto an array of photodetectors. Incoming first light with a first polarization is reflected by a polarizing beam splitter (PBS) to the array, resulting in a first path length and a relatively wide field of view (FOV). Incoming second light with a second polarization passes through the PBS, interacts with a first quarter wave retarder (QWR) and a convex mirror, is reflected by the PBS, passes through a second QWR and is reflected by a flat mirror to pass through the PBS again and onto the array. The second light experiences a second path length greater than the first path length, exhibiting a relatively narrow FOV. The resulting spots of light on the array provide information about a position of the incoming beam.

20 Claims, 11 Drawing Sheets

(56) References Cited

OTHER PUBLICATIONS

"PBSW-1030R—25×36 mm Polarizing Plate Beamsplitter 1030nm", Thorlabs, 1 pg. Retrieved from the Internet: URL: https://www.thorlabs.com/thorproduct.cfm?partnumber=PBSW-1030R.

"Understanding Waveplates and Retarders", Edmund Optics Worldwide, 6 pgs. Retrieved from the Internet: URL: https://www.edmundoptics.com/knowledge-center/application-notes/optics/understanding-waveplates/.

"What are Beamsplitters?", Edmund Optics Worldwide, 2 pgs. Retrieved from the Internet: URL: https://www.edmundoptics.com/knowledge-center/application-notes/optics/what-are-beamsplitters/.

\* cited by examiner

OPTICAL DETECTOR SYSTEM WITH MULTIPLE PATH LENGTHS

BACKGROUND

Wireless transmission of data provides many benefits. Wireless transmission using optical wavelengths such as infrared, visible light, and so forth, facilitates high data rates, and dense networks with reuse of those wavelengths.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
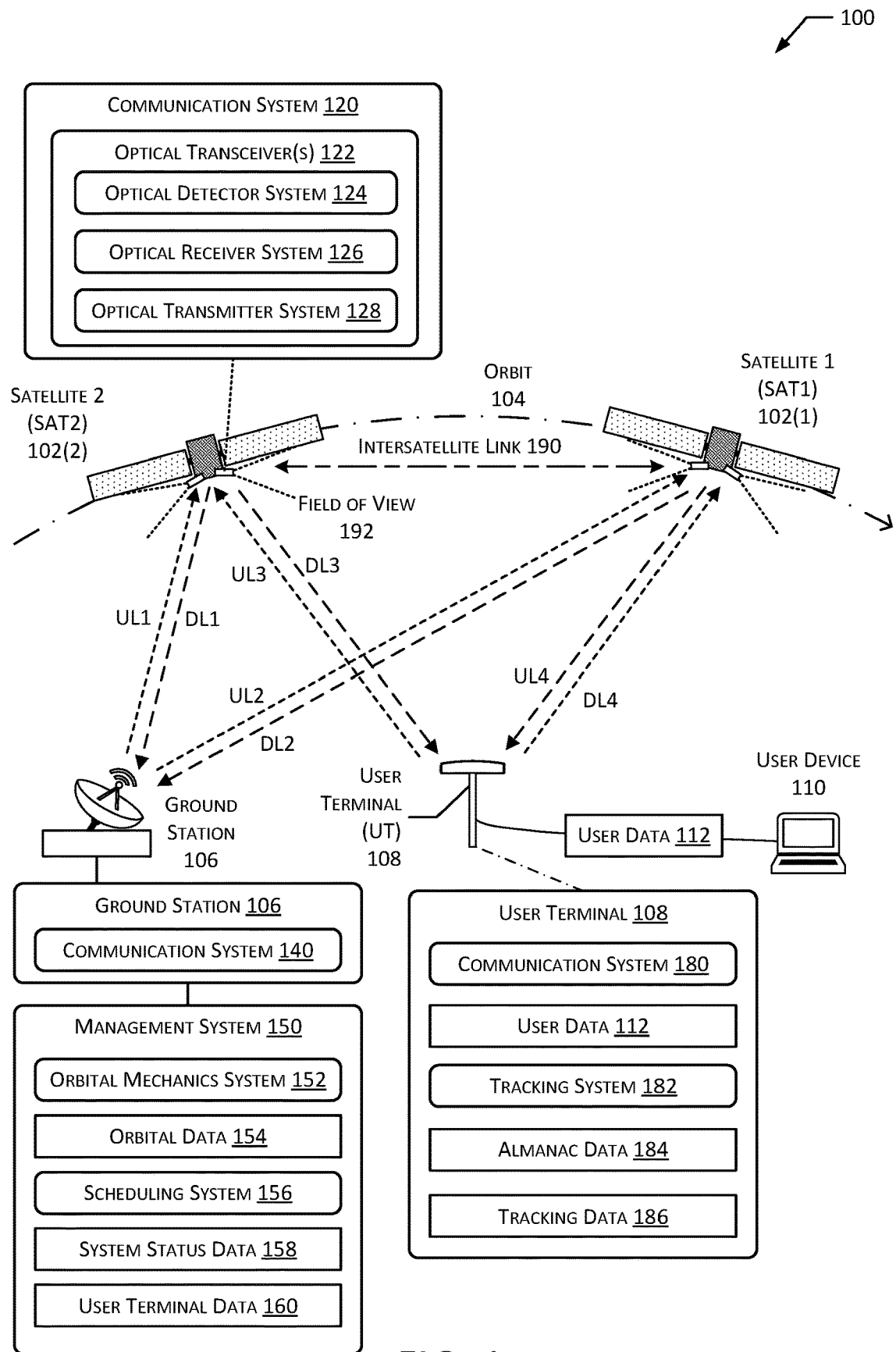
FIG. 1 illustrates a system using ground stations and a constellation of satellites each with an optical transceiver that uses optical wavelengths and an optical detector system to facilitate operation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as optical wavelengths, to send information. Optical wavelengths may include, but are not limited to, infrared wavelengths, visible light wavelengths, ultraviolet wavelengths, and so forth. An optical transceiver comprises a transmitter to send and a receiver to receive signals at optical wavelengths.

Optical wavelengths provide several benefits for data transfer. For example, the high frequencies of optical wavelengths allow high bit rates. Signals at optical wavelengths may be easier to direct in relatively small form factor devices. For example, a telescope may have less volume than a radio-frequency antenna with equivalent gain. Optical wavelengths provide other advantages as well. For example, the same wavelengths may be readily reused simultaneously for communication between different devices, electromagnetic interference from nearby devices may be eliminated, and so forth.

Optical wavelengths may move from one location to another in free space or within a waveguide. Free space may include atmosphere, vacuum, and so forth. In comparison, a waveguide such as an optical fiber may comprise a material such as glass or plastic with an index of refraction such that light at one or more optical wavelengths is propagated within.

A free space optical communication system may be used in a variety of different situations. For example, optical transceivers may be used to provide an intersatellite link between a first satellite and a second satellite, allowing data to be sent from the first satellite to another. In another example, a ground station may communicate with a satellite using an optical transceiver. In still another example, fixed terrestrial stations may communicate with one another using optical transceivers.

As with any system using electromagnetic signals, including optical wavelengths, the received signal must be received with a sufficient signal to noise ratio (SNR) to facilitate the desired communication. As the bit rates increase, the SNR requirements increase as well. By analogy, a person speaking rapidly in a quiet room is much easier to be understood.

To maintain a SNR that allows usable communication over a free space optical communication system, various techniques may be used. At the transmitter, one or more of the transmit power or gain may be increased. An example of increasing the transmit power may involve increasing the brightness of an omnidirectional light source. An example of increasing the gain may be to use reflectors and lenses to direct the light towards a receiver, or to use a directional light source such as a laser that produces a tightly collimated beam of light that is directed towards the receiver.

To provide a needed SNR at the receiver, a more sensitive detector may be used, or gain may be increased. For example, gain may be increased by using a telescope to acquire light obtained from a relatively large lens and focus that light down to a relatively small detector.

To maintain communication, it is necessary for the transmitter and the receiver to be pointed at one another and maintain that pointing. The transmitter is positioned so that the light from the transmitter is directed towards the receiver. Likewise, the receiver is positioned so that the light from the transmitter is received. For example, the light source that is transmitting needs to radiate light in the direction of the receiver, and the receiver needs to gather that light and process it with a detector.

During operation of a free space optical communication system, it may be necessary to keep the beam from the transmitter precisely pointed towards the receiver, and likewise keep the receiver precisely pointed towards the transmitter. The characteristics that make optical wavelengths useful for data transfer also introduce engineering complications. In particular, the narrowness of the beam of incoming light requires careful pointing of the receiving device to keep that incoming light on the detector of the receiver.

In the ideal situation in which the transmitter and the receiver are not in motion and neither is subject to any sort of vibration, maintaining such careful pointing could be done once and never repeated. However, all structures have some mechanical motion or vibration. A tower may sway in the wind, temperature changes cause materials to contract or expand, a motor elsewhere in the device causes some vibration during operation, and so forth. These motions can result in a failure of the receiver to remain properly pointed at the transmitter. Likewise, these motions can result in failure of the transmitter to remain properly pointed at the receiver. A device that is in motion and using optical communication, such as a satellite in orbit, introduces further complications.

The situation is particularly complex when communication needs to be established frequently and quickly. For example, two satellites in different low earth orbits may only have minutes to establish communication and transfer data before moving out of range or into an unfavorable position.

To account for these motions, some form of active adjustment or feedback may be used. While the following descriptions are given with respect to an optical receiver, similar systems and techniques may be used with an optical transmitter.

An active adjustment may include an optical detector system to provide output about how far a beam of incoming light deviates from a specified reference. The output signal (s) from the optical detector system may then be used to operate actuators affixed to a moveable mirror or other optical element. A feedback loop attempts to keep the incoming light aligned to a particular predetermined point, such as a center of a detector array, by using the output to operate the actuators. For example, the detector array may comprise four photodetectors arranged into a two-by-two detector array. As light impinges on each of the photodetectors, an output signal is generated by the individual photodetector. The photodetectors allow for high sensitivity and high sample acquisition rates during operation.

Traditional optical detector systems involve several tradeoffs. Providing the detector array with a wide field of view (FOV) allows a better chance that incoming light will be detected during an acquisition process. However, this wide field of view results in an inability to determine information such as how far from the center of the detector array the spot of incoming light is, impairing ongoing fine tracking. For example, a wide field of view would result in the beam of incoming light having such a small spot size on the detector array that based on output from individual photodetectors, there is not enough information to determine how far away from the center of the detector array the spot is. Continuing the example, if precisely centered and with no gaps between photodetectors, each photodetector would have ¼ of the spot incident, and so the same intensity values would be produced by all four photodetectors. However, as the spot moves away from the center, the spot may soon end up incident only on a single photodetector. The output signal from the single photodetector does not have enough information to determine how far that spot is from the center of the detector array.

One challenge encountered while trying to use such an arrangement to provide input for precision tracking is to avoid overshooting corrections. For example, it is unknown whether the spot is 250 micrometers from the center or 10 micrometers. With this unknown, the moveable mirror may be steered in small increments, such as 5 micrometers at a time, to try and center the incoming light on the detector array. However, this introduces delays while the moveable mirror moves, settles, additional data is acquired and processed, and so forth. In comparison, if distance data was available to indicate that the spot was 250 micrometers from the center, or some value reasonably close, fewer iterations of operating the fast steering mirror (FSM) would be needed. Continuing the example, instead of 50 incremental adjustments, three or fewer adjustments may be used.

Traditional systems may use optical elements with variable or multiple FOV to try and mitigate these problems. A variable FOV system uses actuators and optical elements that move to change the FOV. For example, one or more lenses may move to change focal length, changing from a wide FOV suitable for acquisition to a narrow FOV suitable for tracking. However, this introduces additional cost, complexity, additional mass, additional volume, additional power consumption, and additional failure modes. Operation of actuators in such a system may introduce further vibrations that further complicate pointing. A multiple FOV approach may have a first set of optical elements with a wide FOV suitable for acquisition and a second set of optical elements with a narrow FOV suitable for tracking. However, this approach also includes additional cost, complexity, additional mass, additional volume, additional power consumption, and additional failure modes. While all of these approaches add cost, they also may be prohibitive in a constrained system such as a satellite where mass, volume, power, and reliability are at a premium.

Described in this disclosure are systems and techniques for an optical detector system that provides a wide FOV and a narrow FOV simultaneously by providing different optical path lengths. The wide FOV is provided by a relatively short optical path length while the narrow FOV is provided by a relatively long optical path length. This system provides data that is suitable for both acquisition using the wide FOV and high accuracy tracking using the narrow FOV. The optical detector system described provides unambiguous output that is indicative of a relative position of a center of an incoming beam of light relative to the detector array, as well as distance of the center of the incoming beam of light relative to the detector array. This information may then be used to operate a moveable mirror or other device to provide active tracking of a beam of incoming light.

In one implementation, the optical detector system described herein includes one or more optical elements. Incoming light comprises at least first light that has a first polarization and second light that has a second polarization. The optical elements include a polarized beam splitter (PBS). The PBS will reflect incident light that has the first polarization, while allowing incident light with the second polarization to pass through. A first side of the PBS reflects the first light with the first polarization onto a detector array comprising two or more photodetectors, resulting in a first path length for the first light that is relatively short. This short path length produces a relatively short focal length, producing a relatively wide FOV. The first light provides a first spot or first portion of the incoming light on the detector array.

The incoming second light with the second polarization passes through the PBS. The second light with the second polarization then passes through a first quarter wave retarder (QWR) and is then reflected by a convex mirror back through the first QWR to the PBS. A quarter wave retarder changes the polarization of incident light. Passage through the first QWR twice changes the polarization of the second light from the second polarization to the first polarization. As mentioned above, the PBS will reflect light with the first polarization. The second light, now having the second polarization, is reflected by a second side of the PBS through a second QWR and is then reflected by a flat mirror back through the second QWR through the PBS and toward the detector array. Passage through the second QWR changes the polarization of the second light from the first polarization back to the second polarization. This second light, now with the second polarization, is able to pass through the PBS. This results in a second path length of the second light that is relatively long. This long path length produces a relative long focal length, producing a relatively narrow FOV. The second light provides a second spot or second portion of the incoming light on the detector array.

The first portion and the second portion of the incoming light impinge on the detector array. By dividing the incoming beam to follow two different path lengths, two different FOVs are provided simultaneously. By measuring the output from the respective photodetectors in the detector array, the relative direction and offset of the first portion and the second portion may be determined. For example, if the incoming light is centered on the detector array consisting of four photodetectors in a grid, the output from each photodetector will be approximately the same. In comparison, if the incoming light is generally aligned within the wide FOV and misaligned along the +Y axis within the narrow FOV, the output from a first and second photodetector will be increased and output from a second and third photodetector will be decreased.

Other implementations are also described that provide the wide FOV and the narrow FOV by providing two different optical paths with different path lengths. One implementation utilizes a Wollaston polarizer in conjunction with a PBS and flat mirror to provide the two different optical path lengths. Another implementation uses a beam splitter and a plurality of mirrors to provide the two different optical path lengths. Yet another implementation utilizes a mirrored prism to provide two different optical path lengths.

The system may be used in a variety of applications including, but not limited to intersatellite communications, communications between a satellite and ground station, communications between a satellite and user terminals, between vehicles, between terrestrial stations, and so forth. For example, the system may be used in terrestrial applications, mobile applications, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals with various wavelengths, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 700 km will circle the Earth about every 96 minutes. To an observer on the ground, the satellite in the 700 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 700 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 comprises a communication system 120. The communication system 120 may include one or more optical transceivers 122. The optical transceiver 122 uses optical wavelengths such as infrared light, visible light, ultraviolet light, and so forth for communication. The optical transceiver 122 may include an optical detector system 124 and one or more of an optical receiver system 126 or an optical transmitter system 128. The optical detector system 124 provides information about a relative alignment of incoming light. This information may then be used to adjust actuators that direct the incoming light into a desired alignment. For example, the optical detector system 124 may determine a distance and direction that the incoming light transmitted by an optical transmitter system 128(2) from the second satellite 102(2) is off center. One or more actuators may be operated responsive to this information to center the incoming light. Output from the optical detector system 124 may be part of a feedback loop that attempts to track the incoming light and maintain a desired alignment of the incoming light. For example, tracking keeps a beam of incoming light centered on a photodetector that is used to detect changes in the incoming light that are used to send data. Operation of the optical detector system 124 is discussed in more detail in the following description.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data 112 or other data between the one or more communication networks and the satellites 102. Such data may be processed by the ground station 106 and communicated via the communication system 140. The communication system 140 of a ground station 106 may include components similar to those of the communication system 120 of a satellite 102 and may perform similar communication functionalities. For example, the communication system 140 may include one or more optical transceivers 122. In other implementations, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data 112. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of a communication system of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data 112 between the constellation of satellites 102 and the user device 110. The user data 112 includes data originated by the user device 110 or addressed to the user device 110. The UT 108 may be fixed or in motion. For example, the UT 108 may be used at a residence, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, the optical transceivers 122 may be used to provide an intersatellite link 190 that provides for communication between satellites 102 in the constellation. In some implementations the uplink(s) and downlink(s) may use radio wavelengths while the intersatellite link(s) 190 use optical wavelengths.

The intersatellite link 190 allows the satellites 102 to transfer data. This data may include tracking, telemetry, and control data. For example, satellite 102(2) may be out of range of a ground station 106 and sends telemetry data using the intersatellite link 190 to satellite 102(1). Satellite 102(1) then relays the telemetry data to the ground station 106 that in turn sends the telemetry data to the management system 150. The intersatellite link 190 may also be used to send user data 112. For example, if ground station 106(1) is unavailable to handle downlink traffic from satellite 102(1), then satellite 102(1) may use the intersatellite link 190 to send the user data 112 to satellite 102(2) that is in communication with ground station 106(2). In another example, user data 112 from a first UT 108(1) that is addressed to a second UT 108(2) may be sent from the first satellite 102(1) to the satellite 102(X) that is providing service to the second UT 108(2) using the intersatellite link 190.

The satellites 102 within the constellation have different orbital parameters. This results in a variety of possible relative motions between satellites 102 in the constellation. For example, if the satellite 102(1) is in an equatorial orbit at a first altitude and satellite 102(2005) is in a polar orbit at a second altitude, they may only be within communication range of one another for a few minutes. Due to the different relative positions of those satellite 102 with respect to Earth at any given time, satellites 102 in the constellation are affected in various ways. For example, satellite 102(2) may experience a slight increase in altitude from a predicted position due to a slight variation in Earth's gravitational field. In another example, a satellite 102 that is in sunlight will experience light pressure causing some slight movement from a predicted position. Additionally, thermal effects such as expansion and contraction, operation of actuators, and so forth introduce vibration into the structure of the satellite 102.

The optical transceivers 122 have a field of view 192. For example, the field of view (FOV) 192 may be determined based on the focal length of an optical system such as a telescope. In one implementation the FOV 192 describes a solid angle within which incoming light will be acquired and directed to various parts of the optical transceiver 122, such as a detector within the optical receiver system 126. The detector within the optical receiver system 126 may be used to determine one or more of amplitude, phase, frequency, polarization, and so forth of the incoming light. Output from the detector may be processed by the optical receiver system 126 to determine received data. For communication to take place, a first beam of light sent by an optical transmitter system 128(2) of the second satellite 102(2) must be within a first FOV 192(1) of the optical transceiver 122(1) of the first satellite 102(1). For bidirectional communication between the satellites 102, the converse must also be true. Continuing the example, a second beam of light sent by an optical transmitter system 128(1) of the first satellite 102(1) must be within a second FOV 192(2) of the optical transceiver 122(2) of the second satellite 102(2).

Because of the dynamic motion of the satellites 102, variances between predicted positions compared to actual positions, vibration, and other factors, it is advantageous to rapidly acquire incoming light and track that incoming light to maintain communication. The optical detector system 124 facilitates this tracking by providing information as to a relative location of incoming light with respect to a detector array. Output from the optical detector system 124 may then be used to provide for active tracking. For example, output from the optical detector system 124 may be used to adjust a moveable mirror in the optical transceiver 122 to maintain the incoming light in a desired alignment. Continuing the example, the desired alignment may place a spot of the incoming light onto a detector of the optical receiver system 126. The optical receiver system 126 may provide as output received data corresponding to data that is represented by the incoming light. In some implementations, the optical transmitter system 128 may utilize a portion of the same optical path. For example, outgoing light from the optical transmitter system 128 may also impinge on the moveable mirror and thus is directed towards optics of the remote optical transceiver 122.

The optical detector system 124 may provide incoming light with both a short optical path and a long optical path. The short optical path length results in a wide field-of-view (FOV), while the long optical path results in a narrow FOV. The optical elements of the optical detector system 124 direct a first portion of incoming light onto a detector array. A first path of the first portion of the incoming light has a first length. The optical elements of the optical detector system 124 also direct a second portion of incoming light onto a detector array. A second path of the second portion of the incoming light has a second length that is greater than the first length. This difference in path length results in the light impinging on the detector array providing information corresponding to both a narrow FOV and a wide FOV. Output of the detector array may be used to determine first data indicative of a direction of incoming light relative to a predetermined point on the detector array. The first data may then be used to operate one or more actuators of the FSM.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
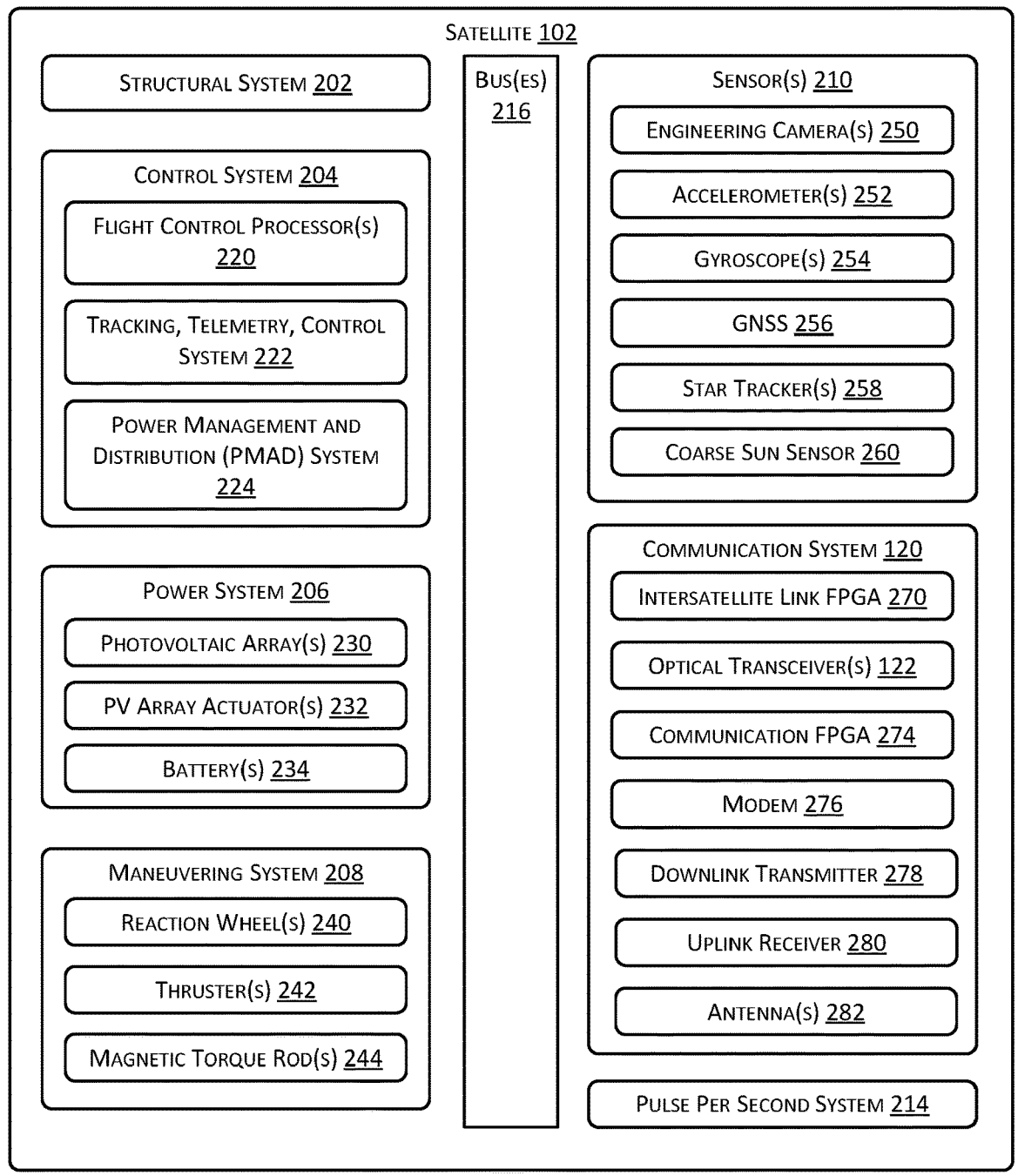
FIG. 2 is a block diagram of some systems associated with the satellite, according to some implementations.

FIG. 2 is a block diagram of some systems associated with the satellite 102, according to some implementations. The satellite 102 may comprise a structural system 202, a control system 204, a power system 206, a maneuvering system 208, one or more sensors 210, and a communication system 120. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, ground stations 106, user terminals 108, and so forth. The communication system 120 may include one or more modems 276, digital signal processors, power amplifiers, antennas 282 (including at least one antenna that implements multiple antenna elements, such as a phased array antenna), lasers, telescopes, photodetectors, processors, memories, storage devices, communications peripherals, interface buses, and so forth. Such components support communications with other satellites 102, ground stations 106, user terminals 108, and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the intersatellite link 190. For example, an intersatellite link FPGA 270 may be used to modulate data that is sent and received by an optical transceiver 122 to send data between satellites 102. The optical transceiver 122 may operate using optical wavelengths.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The downlink transmitter(s) 278 and uplink receiver(s) 280 may be implemented as a transceiver. The transceiver may be connected to one or more antennas 282. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

Figure 3:
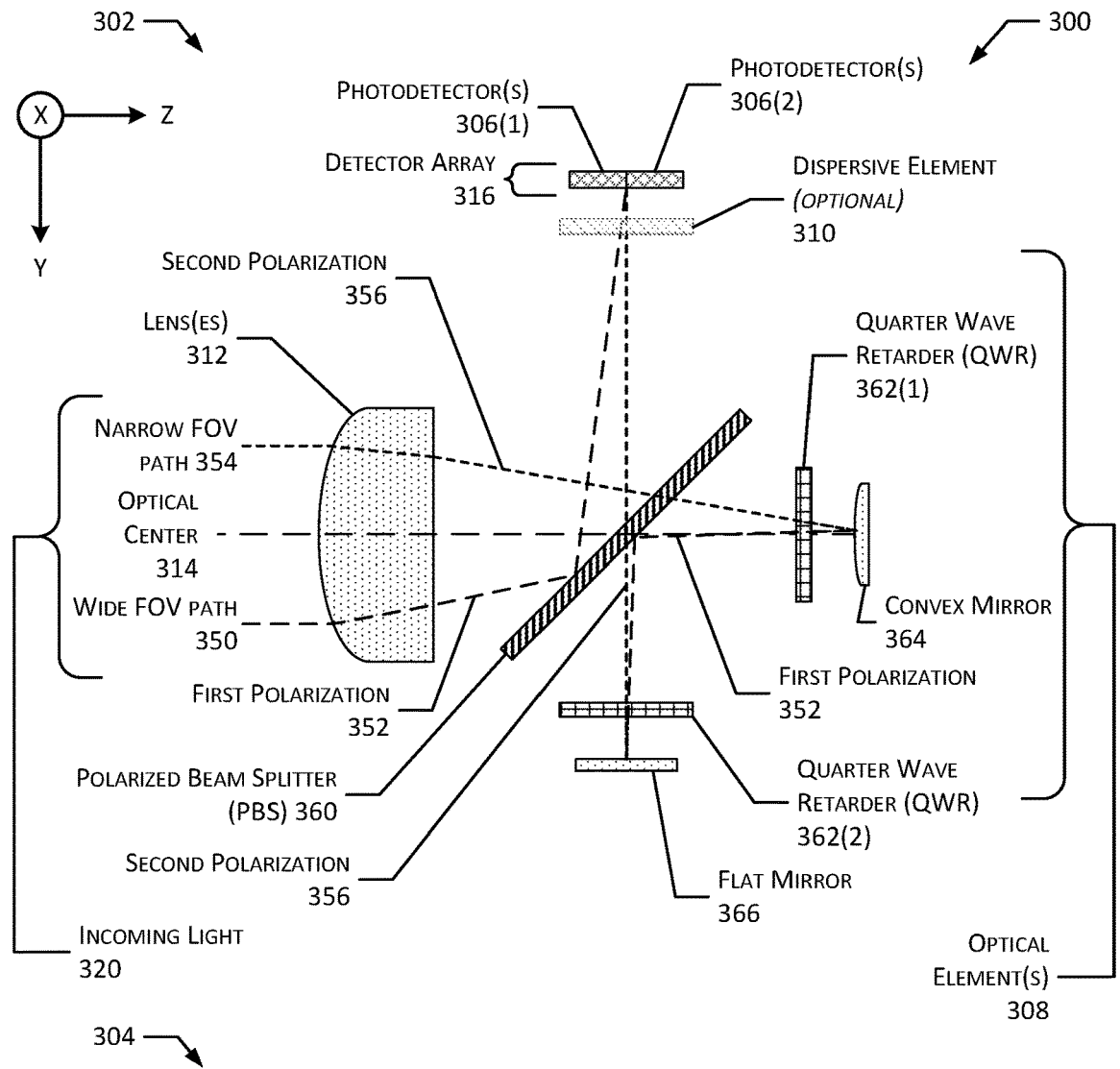
FIG. 3 is a block diagram of a first implementation of the optical detector system having multiple path lengths and a detector array, according to some implementations.
Figure 3:
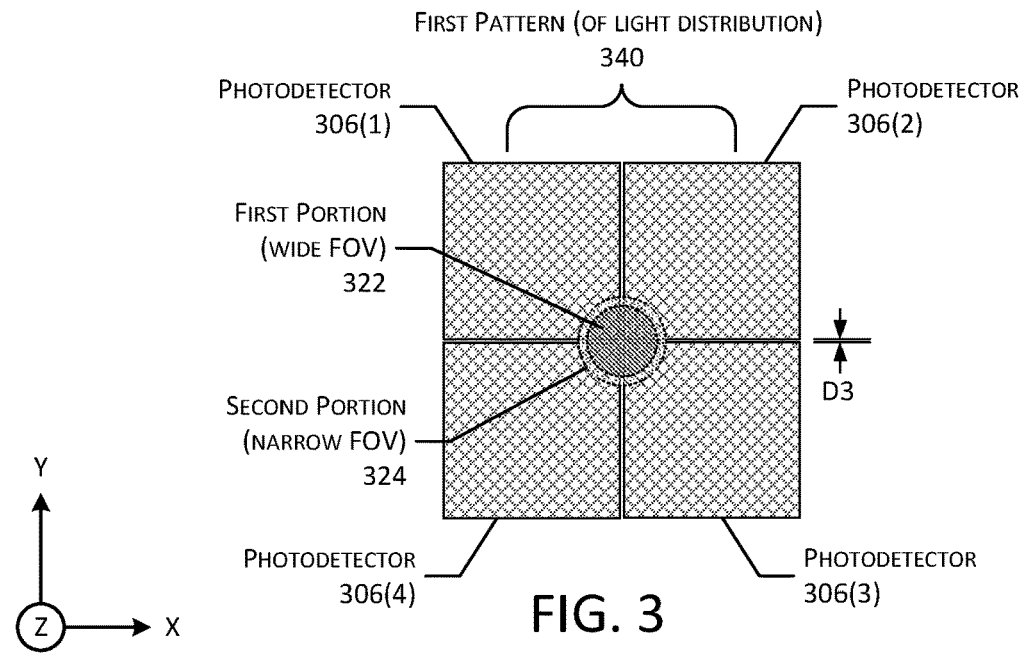

FIG. 3 is a block diagram 300 of a first implementation of the optical detector system 124, according to some implementations. In this illustration a side view 302 of the optical detector system 124 is shown as well as a front view 304 of a detector array 316.

The optical detector system 124 comprises a detector array 316. The detector array 316 comprises a plurality of photodetectors 306. The photodetectors may comprise photomultiplier tubes (PMT), silicon photomultipliers, avalanche photodiodes, and so forth. In one implementation, the detector array 316 may comprise four photodetectors 306(1)-(4) arranged in a two-by-two array. For example, the detector array 316 may comprise four indium gallium arsenide (InGaAs) photodiodes in a common package, such as the G6849 series from Hamamatsu Photonics K.K. of Japan. As shown in the front view 304, the four photodetectors 306(1)-(4) are arranged such that the first photodetector 306(1) is adjacent to the second photodetector 306(2), the second photodetector 306(2) is adjacent to the third photodetector 306(3), the third photodetector 306(3) is adjacent to the fourth photodetector 306(4), and the fourth photodetector 306(4) is adjacent to the first photodetector 306(1).

In other implementations the detector array 316 may use other arrangements of a plurality of photodetectors 306. For example, if tracking with respect to a single axis is needed, two or more photodetectors 306 may be arranged in a line. In another example, the detector array 316 may comprise an eight-by-eight array of 84 photodetectors 306. In still another example, the detector array 316 may comprise an imaging device such as a charge coupled device (CCD), complementary metal oxide semiconductor (CMOS) imager, and so forth.

The photodetectors 306 provide as output a signal that is indicative of light incident upon their active area. For example, light incident on an active portion of a photodetector 306 may produce an output current that is proportionate to power of the incident light. Individual photodetectors 306 may be separated from one another by some distance D3. For example, the distance D3 may be 30 micrometers.

The optical detector system 124 includes one or more optical elements 308. These optical elements 308 may include one or more lenses 312, a polarized beam splitter (PBS) 360, quarter wave retarders (QWR) 362, a convex mirror 364, a flat mirror 366, and so forth. In some implementations one or more dispersive elements 310 may also be included.

The detector array 316 and a portion of the optical elements 308 may be aligned along an optical center 314. For example, the optical center 314 may be indicative of a line that is centered on the lens 312, the PBS 360, a first QWR 362(1), and the convex mirror 364. The detector array 316 may be centered on a line that is perpendicular to the optical center 314 and extending from the PBS 360.

The lenses 312 may include one or more of convex lenses, meniscus lenses, concave lenses, and so forth. The one or more lenses 312 may direct first light having a first polarization 352 of the incoming light 320 to produce a first portion 322 on the detector array 316. The first portion 322 covers a first area on the detector array 316. Likewise, second light having a second polarization 356 of the incoming light 320 is directed to produce a second portion 324 on the detector array 316. The second portion 324 covers a second area on the detector array 316. When the incoming light 320 is aligned with the optical center 314, the center of the first portion 322 and the center of the second portion 324 are centered on the detector array 316, as shown here.

The PBS 360 has a first side and a second side. The PBS 360 may comprise a planar or plate PBS, a cubic PBS comprising two or more prisms, and so forth. The PBS 360 may comprise a polarizing element such as wire grid, film, calcite, alpha-BBO, rutile, and so forth as well. For example, if the optical detector system 124 is operated with light at a wavelength of 1064 nanometers (nm), the PBS 360 may comprise a PBSW-1030R polarizing plate beam splitter from Thorlabs, Inc., Newton, New Jersey, United States of America.

The QWR 362 may comprise a waveplate or retarder that changes the polarization direction of light passing through. The QWR 362 may provide quarter-wave retardation, such that two successive passes through the same QWR 362 result in a change from s polarization to p polarization, or vice versa. The waveplate may comprise a birefringent material such as quartz, mice, polymer, and so forth. The waveplate introduces a controlled phase shift in the incident light, changing the polarization. Continuing the earlier example, if the optical detector system 124 is operated with light at a wavelength of 1064 nm, the QWR 362 may comprise a quarter-wavelength crystalline waveplate stock number 85-029 from Edmund Optics Inc., of Barrington, New Jersey, United States of America.

The optical elements 308 include a first mirror such as the convex mirror 364 and a second mirror such as the flat mirror 366. The mirrors are reflective at the wavelength of light associated with operation of the system. The mirrors may comprise a dielectric coating on a substrate. Continuing the earlier example, the flat mirror 366 may comprise stock number 38-829 from Edmund Optics, Inc.

The incoming light 320 comprises first light and second light. The first light exhibits a first polarization 352 and the second light exhibits a second polarization 356. For example, the first polarization 352 may be s polarized light while the second polarization 356 may be p polarized light. The PBS 360 is reflective to the first polarization 352 and transmissive to the second polarization 356.

In the configuration depicted in FIG. 3, the PBS 360 has a first side and a second side. The first side of the PBS 360 may be adjacent to the detector array 316. The first QWR 362(1) may be adjacent to the second side of the PBS 360. The first QWR 362(1) may be between the PBS 360 and a first mirror, such as the convex mirror 364. The second QWR 362(2) may be adjacent to the second side of the PBS 360. The second QWR 362(2) may be between the PBS 360 and a second mirror, such as the flat mirror 366.

The positions of at least some of the optical elements 308 shown may be fixed with respect to one another. For example, the distances between the PBS 360 and one or more of: the detector array 316, the first QWR 362(1), the first mirror such as the convex mirror 364, the second QWR 362(2), or the second mirror such as the flat mirror 366, the dispersive element 310, or other elements may be fixed. By remaining fixed, the mass, complexity, power consumption, and so forth of the optical detector system 124 is improved.

A first side of the PBS 360 reflects the first light comprising the first polarization 352 of the incoming light toward the detector array 316. The second light comprising the second polarization 356 passes through the PBS 360.

The second light, having passed through the PBS 360 a first time, passes through a first QWR 362(1) that changes the polarization of the second light to a first intermediate polarization. The second light with the first intermediate polarization is reflected by the convex mirror 364 back through the first QWR 362(1) towards the second side of the PBS 360. In passing through the first QWR 362(1) a second time, the second light with the first intermediate polarization undergoes a change in polarization to the first polarization 352. It is important to recall that the PBS 360 is reflective to the first polarization 352. As a result, the second light, now with the first polarization 352, is reflected from the second side of the PBS 360 through a second QWR 362(2) towards the flat mirror 366.

The second light, now with the first polarization 352, passes a first time through the second QWR 362(2) that changes the polarization of the second light from the first polarization 352 to a second intermediate polarization. The second light with the second intermediate polarization is reflected by the flat mirror 366 back through the second QWR 362(2) towards the detector array 316. In passing through the second QWR 362(2) a second time, the second light with the second intermediate polarization undergoes a change in polarization to the second polarization 356. It is important to recall that the PBS 360 is transmissive to the second polarization 356. The second light as reflected by the flat mirror 366, having the second polarization 356, passes through the PBS 360 and impinges upon the detector array 316, forming the second portion 324 of incoming light on the detector array 316.

Figure 4:
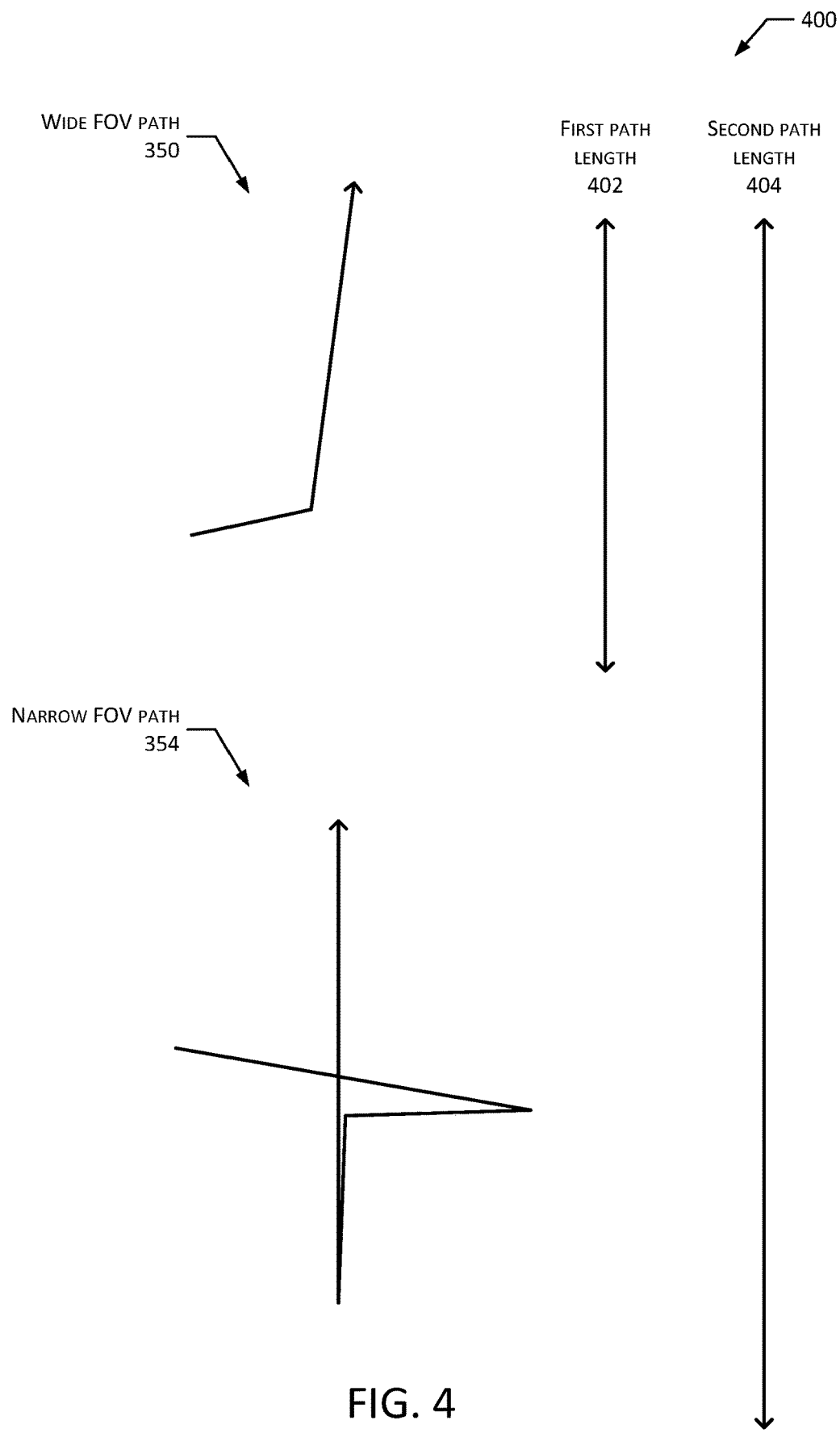
FIG. 4 illustrates the different path lengths provided by the optical detector system, according to some implementations.

As described in more detail with regard to FIG. 4, light with the first polarization 352 travels a shorter path length than the light with the second polarization 356. This difference in path length results in different focal lengths, producing different FOV values. The incoming light 320 with the first polarization 352 travels the relatively short wide FOV path 350. The incoming light 320 with the second polarization 356 travels the relatively long narrow FOV path 354. As a result, the optical detector system 124 is able to simultaneously provide information about incoming light 320 that is within one or more of the wide FOV, the narrow FOV, or both.

The combination of the first portion 322 and the second portion 324 produces a first pattern 340 of light distribution of the incoming light 320. The first pattern 340 of light distribution may vary due to changes in relative position of the first portion 322 and the second portion 324. As shown here, first portion 322 resulting from the first light following the wide FOV path 350 overlaps the second portion 324 resulting from the second light following the narrow FOV path 354. Due to the different path lengths and resulting differences in focal length, a divergence in alignment will result in different divergence or offset of the first portion 322 and the second portion 324 with respect to the detector array 316. For example, a relatively small misalignment would result in the first portion 322 remaining centered on the detector array 316 while the second portion 324 would be displaced farther from the center of the detector array 316. This results in output from the photodetectors 306 that may be used to determine the direction and distance of the displacement of the incoming light 320 with respect to the detector array 316. This is discussed in more detail with regard to FIG. 7.

In other implementations, other arrangements of one or more of lenses 312, mirrors, or other optical elements may be used. For example, the lens(es) 312 may be omitted and the PBS 360 may be concave instead of planar as shown in FIG. 3. The concavity may be directed towards the detector array 316, such that the concavity focuses incoming first light on the detector array 316.

In some implementations the optical detector system 124 may include one or more of the dispersive elements 310. The one or more dispersive elements 310 introduce a dispersion to a portion of the incoming light 320, changing the pattern of light incident on the detector array 316. In this illustration, the dispersive element 310 is positioned between the PBS 360 and the detector array 316. In other implementations, the one or more dispersive elements 310 may be positioned elsewhere within the optical path. The distance between the dispersive element 310 and the detector array 316 may be fixed in some implementations.

The one or more dispersive elements 310 may comprise one or more diffractive elements, one or more diffusive elements, one or more lenses, a microlens array, and so forth. The one or more diffractive elements may comprise a diffraction grating. For example, the diffraction grating may comprise an etched grating on a fused silica substrate. The one or more diffusive elements may comprise an optical diffuser, such as a transparent substrate with one or more translucent portions. For example, the diffusive elements may comprise a low-density dot diffuser, an opal diffusing glass, ground glass diffuser, diffractive diffuser, and so forth. The one or more lenses 312 may comprise spherical or aspherical lenses in various arrangements. For example, a plurality of concave lenses may be arranged in a planar array, such as twelve-by-twelve, with a central opening through which the first portion 322 of the incoming light 320 may pass unaffected. The microlens array may comprise one or more physical features that refract the incoming light 320 to produce the second portion 324 of the incoming beam. For example, the microlens array may comprise lens features imposed on at least a portion of a substrate. The arrangement, size, packing density, and other aspects of the features may be asymmetrical along one or more axes of the dispersive element 310. For example, a center of the dispersive element 310 coincidence with the optical center 314 may be plano to allow the first portion 322 of the incoming light 320 to be produced, while concentric rings of features of varying size and packing density produce the second portion 324 of the incoming light 320.

In some implementations, a combination of dispersive elements 310 may be used. For example, the dispersive element 310 may comprise a substrate having microlens features on a first side and one or more diffractive elements on a second side that is opposite the first side. In another example, the dispersive element 310 may comprise one or more diffusive elements affixed to or integral with the lens 312.

FIG. 4 illustrates at 400 the different path lengths provided by the optical detector system 124, according to some implementations. For clarify, in this illustration the various optical elements 308 have been omitted. The wide FOV path 350 is shown, as is the narrow FOV path 354.

The FOV of the optical detector system 124 is shown at Equation 1 and is based on a width w of a detector array 316 (where the detector array 316 is symmetrical, such as square or circular in area) and the focal length f that describes a distance between the detector array 316 and a point of the lens 312 at the optical center 314. As shown in Equation 1, increasing the focal length reduces the FOV.

$$FOV = 2 \times \arctan\left(\frac{w}{2f}\right)$$

(Equation 1)

As described above with respect to FIG. 3, a wide FOV path 350 describes a first ray of the first light of the incoming light 320 having the first polarization 352 that is reflected into the detector array 316. This results in a first path length 402 also shown in FIG. 4. In comparison, the narrow FOV path 354 describes a second ray of the second light of the incoming light 320 having the second polarization 356. The narrow FOV path 354 results in a second path length 404 that is greater than the first path length 402. As a result of this difference in path length, two different FOVs are simultaneously available to the detector array 316.

Figure 5:
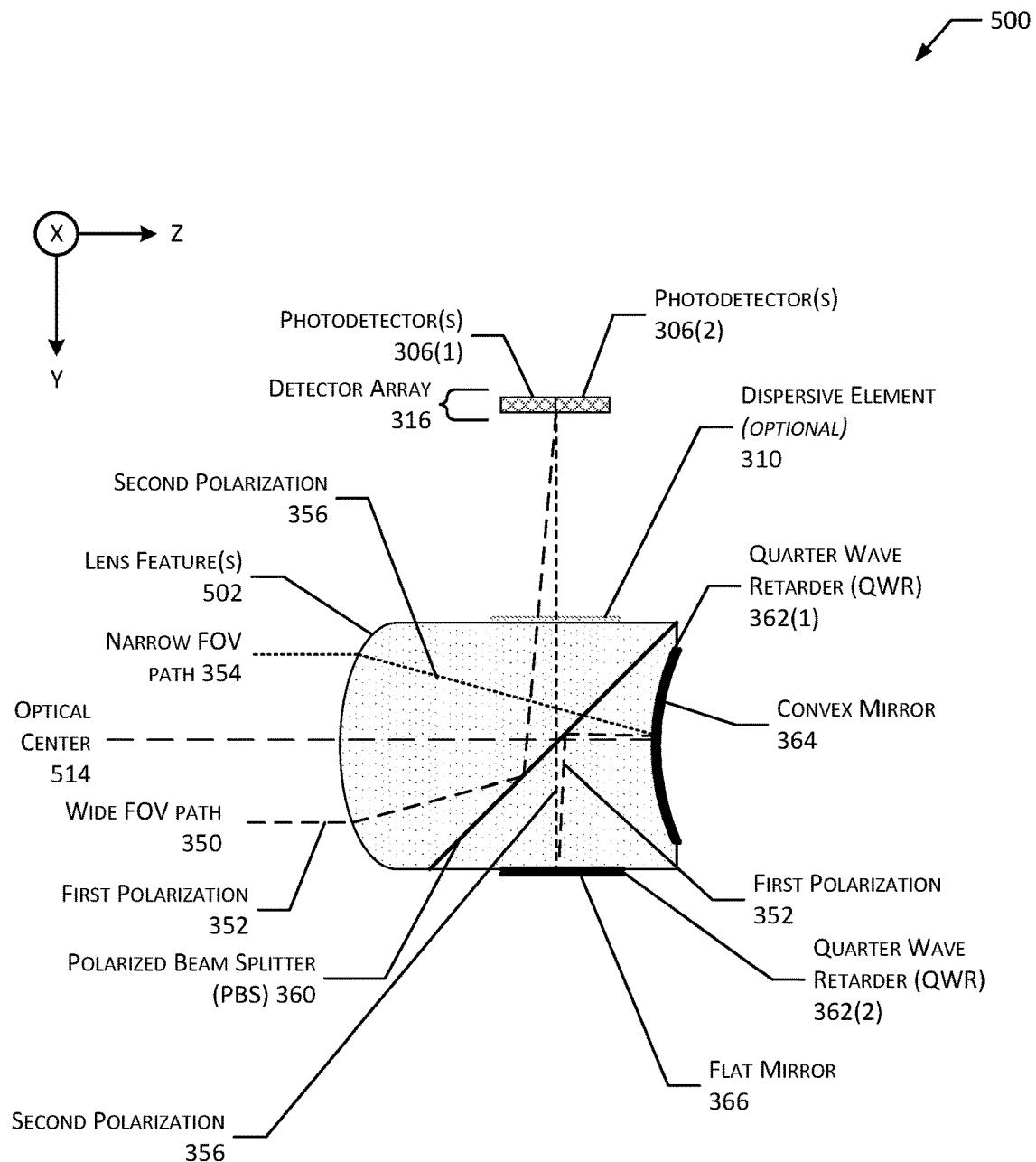
FIG. 5 is a block diagram of a second implementation of the optical detector system having multiple path lengths and a detector array in a monolithic form factor, according to some implementations.

FIG. 5 is a block diagram 500 of a side view of a second implementation of the optical detector system 124 having multiple path lengths and a detector array 316 in a monolithic form factor, according to some implementations.

In this illustration, the PBS 360 may comprise a cube. The cube may comprise a pair of prisms that have been joined. The cube of the PBS 360 has a first face that receives the incoming light 320, a second face that is proximate to the detector array 316, a third face that is opposite the first face, and a fourth face that is opposite the second face. A lens 312 (not shown) may be affixed to, or integral with, the first face to provide lens features 502. The first QWR 362(1) and the convex mirror 364 are affixed to, or integral with, the third face. For example, the appropriate concavity may be formed into the cube and coated or plated to provide the first QWR 362(1) and the convex mirror 364.

The second QWR 362(2) and the flat mirror 366 may also be affixed to, or integral with, the fourth face. For example, a portion of the fourth face of the cube may be coated or plated to provide the second QWR 362(2) and the flat mirror 366.

The dispersive element 310, if present, may be affixed to, or integral with, the second face. For example, a diffraction grating may be etched into a portion of the second face.

In another implementation, not shown, the detector array 316 may be affixed to the second face of the cube. For example, the detector array 316 may be attached by an optical adhesive or external frame to the cube.

Figure 6:
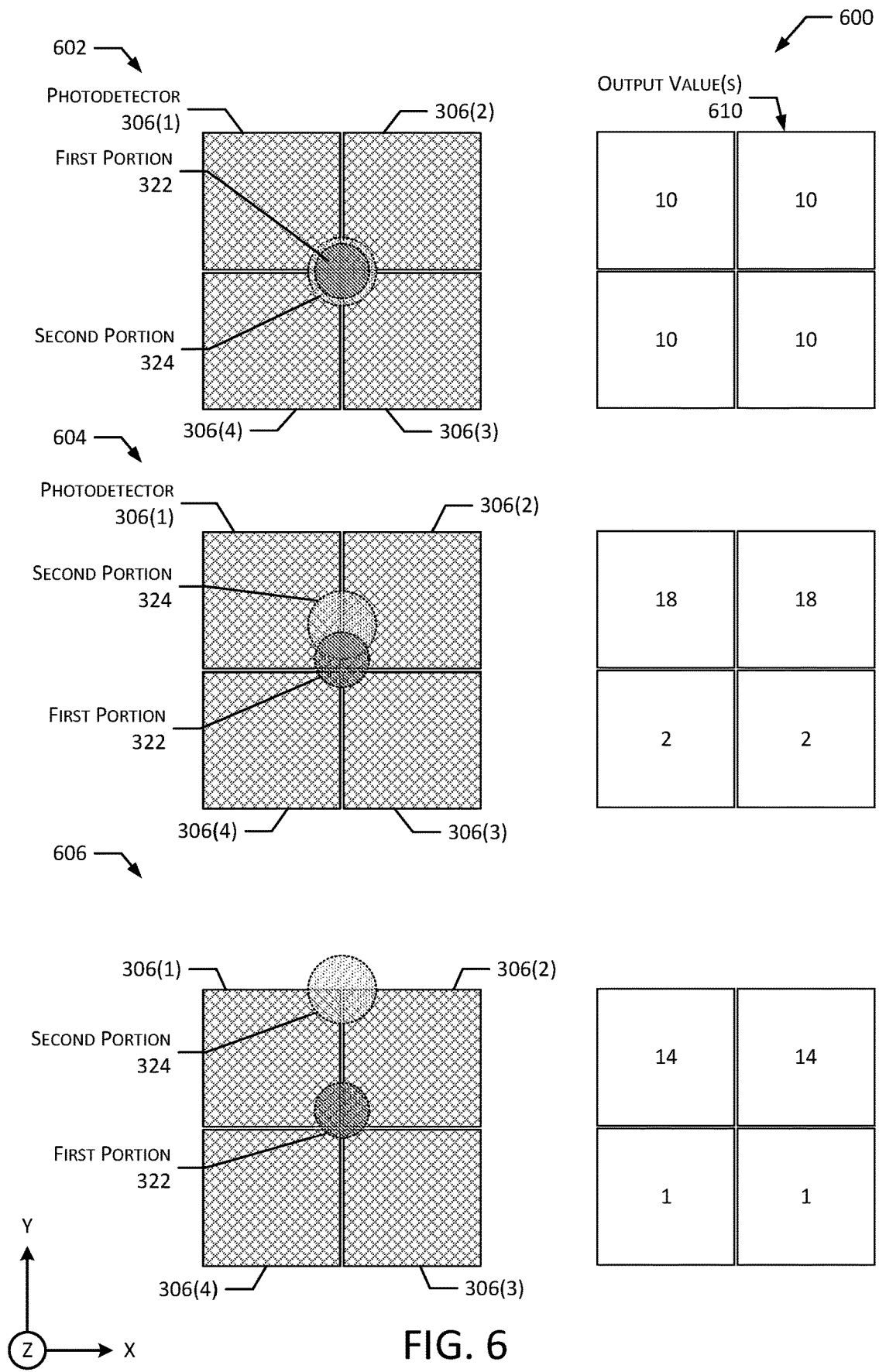
FIG. 6 depicts intensity values produced by the detector array under various configurations of incident light, according to some implementations.

FIG. 6 depicts a scenario 700 of intensity values produced by the detector array 316 under various configurations of incoming light 320, according to some implementations. In this depiction, a first column to the left of the page depicts a front view of the detector array 316 and the first pattern 340 of incoming light 320 on the photodetectors 306 in the detector array 316. A second column depicts output values 610 from the respective photodetectors 306 that would correspond to the configuration of incoming light 320 shown in the first column.

At 602 the first pattern 340 comprising the first portion 322 and the second portion 324 is centered on the detector array 316. The first pattern 340 is evenly divided across the four photodetectors 306(1)-(4). As a result, the corresponding output values 610 of the photodetectors 306 are all equal.

At 604 the first pattern 340 has changed, with the first portion 322 translating slightly upwards along a Y axis and remaining centered along an X axis while the second portion 324 translates substantially upwards along the Y axis and remains centered along the X axis. Compared to 602, the first portion 322 now covers a larger portion of the first photodetector 306(1) and the second photodetector 306(2) and a smaller part of the third photodetector 306(3) and the fourth photodetector 306(4). Meanwhile the second portion 324 no longer covers the third photodetector 306(3) and the fourth photodetector 306(4). Because of the greater incident area on the photodetectors 306(1) and 306(2) of incoming light 320 compared to the photodetectors 306(3) and 306(4), the output values 610 from photodetectors 306(1) and 306(2) are significantly greater than the output values 610 from photodetectors 306(3) and 306(4).

At 606, the first portion 322 has translated further upwards along the Y axis, and the second portion 324 is almost bisected by an edge of the detector array 316.

The first portion 322 predominately covers the first photodetector 306(1) and the second photodetector 306(2), only slightly covering the third photodetector 306(3) and the fourth photodetector 306(4). The second portion 324 has only a first quarter of its area covering the first photodetector 306(1) and a second quarter covering the second photodetector 306(2), the rest falling outside of the detector array 316. As a result, the corresponding output values 610 for photodetectors 306(1) and 306(2) have decreased relative to 604. Likewise, the output values 610 for photodetectors 306(3) and 306(4) are now very low, as little incoming light 320 is incident on these.

The effects of the optical elements 308 on the incoming light 320 are known. As a result, it is possible to determine at least a relative distance or displacement of the incoming light 320 relative to a portion of the detector array 316. For example, data structures, algorithms, or other techniques may be used to determine, given the particular output values 610 corresponding to the configuration shown at 606, the distance from the center of the detector array 316 to a center of the incoming light 320. This allows for both coarse adjustment such as during acquisition and fine adjustment such as during tracking.

In some implementations a total intensity of the incoming light 320 may be measured or assumed. Based on a comparison of the output values 610 corresponding to the total intensity, a determination may be made as to whether the light impinging on the detector array 316 results from only the first portion 322 comprising the wide FOV. For example, if the incoming light 320 is at the edge of the wide FOV, the first portion 322 may impinge on the detector array 316 while the second portion 324 does not. A comparison of a sum of the output values 610 may be compared to the total intensity to disambiguate this situation. For example, if the sum of the total output values 610 is less than or equal to one-half of the total intensity, the optical detector system 124 may determine that the incoming light 320 corresponds to the wide FOV and not the narrow FOV.

Figure 7:
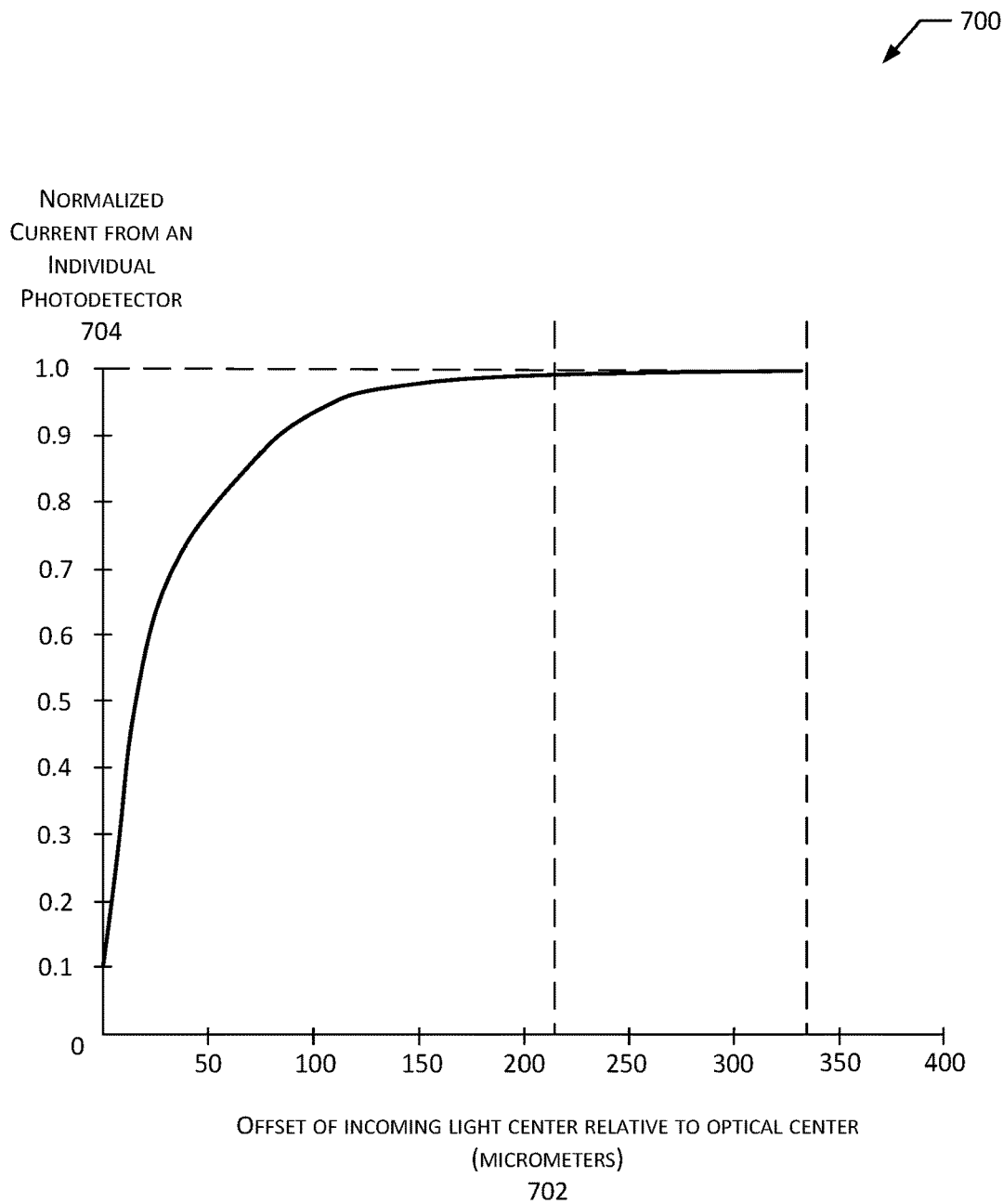
FIG. 7 is a graph of output from a photodetector in a detector array associated with a first pattern and a second pattern of incoming light produced by the optical arrangement described, according to some implementations.

FIG. 7 is a graph 700 of output from a photodetector 306 in a detector array 316 associated with the first pattern 340 during use of the optical detector system 124 described herein, according to some implementations.

In this graph, a horizontal axis indicates an offset 702 of incoming light 320 centered relative to an optical center 314. In this illustration, the offset 702 is measured in micrometers. A vertical axis indicates a normalized current 704 from an individual photodetector 306 in the detector array 316. In this illustration, the current 704 has been normalized to a value of between 0.0 and 1.0.

A plot of the first pattern 340 is shown. The offset 702 increases as one or more of the first portion 322 or the second portion 324 moves away from the center of the detector array 316. As this distance increases, the portion of the incoming light 320 that is incident on the individual photodetector 306 varies, changing a total power of the light incident on the active portion of the individual photodetector 306. This in turn changes the output signal of the photodetector 306 and corresponding output value 610 produced.

Figure 8:
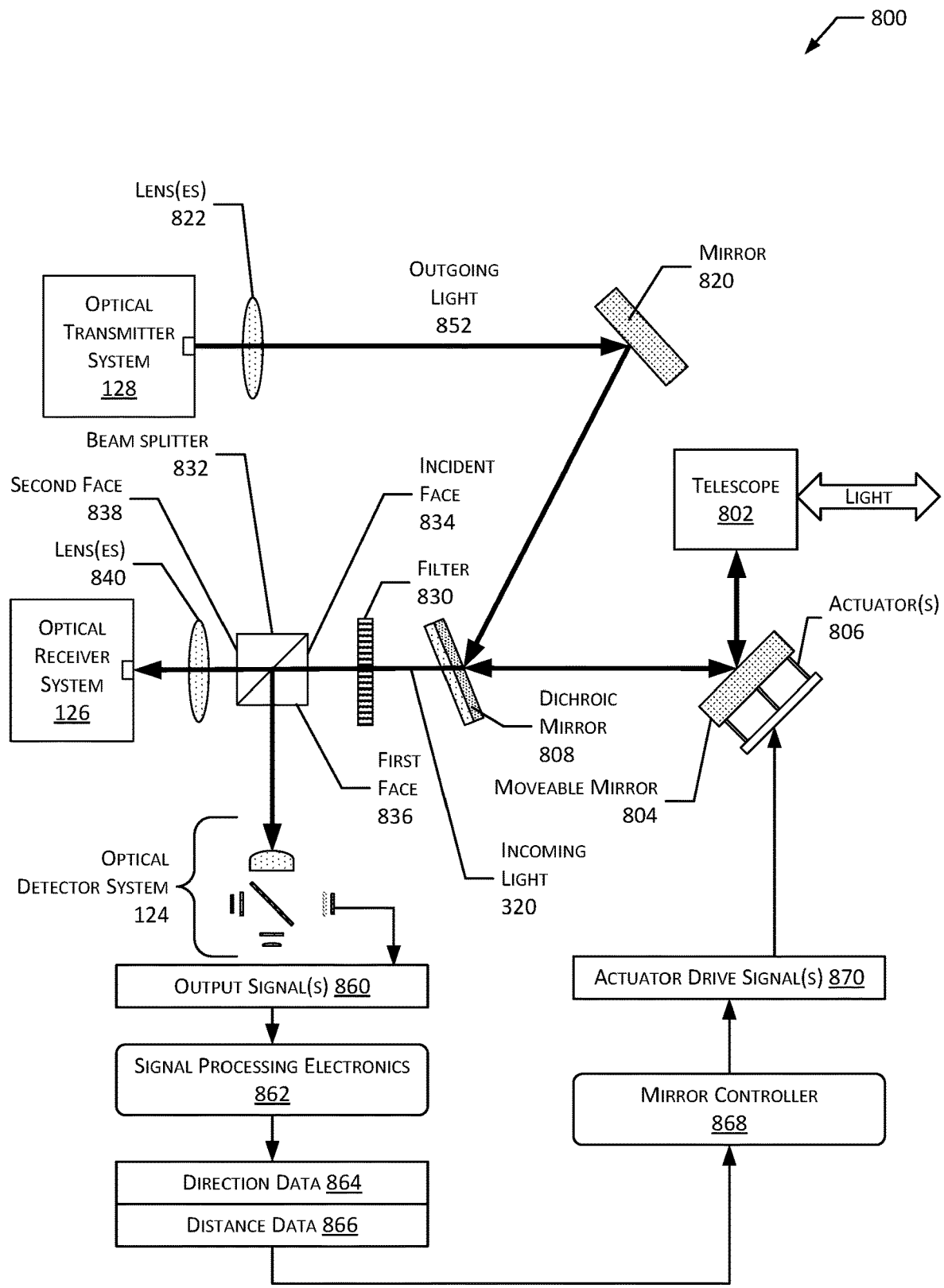
FIG. 8 is a block diagram of the optical transceiver, according to some implementations.

FIG. 8 is a block diagram 800 of the optical transceiver 122, according to some implementations. A telescope 802 or other arrangement of optical elements may be used to acquire incoming light 320 and emit outgoing light 852. An optical path of the optical transceiver 122 may include one or more moveable mirrors 804 with one or more associated actuators 806. During operation, the one or more moveable mirrors 804 may change a path of one or more of the incoming light 320 or the outgoing light 852. In some implementations the moveable mirror 804 and the actuator 806 may comprise a microelectromechanical system. In some implementations the actuators 806 may comprise motors, piezoelectric devices, voice coils, and so forth. For example, a fast steering mirror (FSM) comprising a mirror that is moved based on activation of a voice coil may be used as the moveable mirror 804 and the actuator 806.

A dichroic mirror 808 may be used to selectively direct particular wavelengths of light between the optical transmitter system 128 and the optical receiver system 126. For example, the dichroic mirror 808 may pass incoming light 320 with a first wavelength to the optical receiver system 126 while reflecting outgoing light 852 with a second wavelength. A detector within the optical transmitter system 128 may determine one or more characteristics of the incoming light 320, including but not limited to amplitude, phase, frequency, polarization, and so forth. These characteristics may be used to convey data. The optical receiver system 126 may use output from the detector to determine received data that corresponds to data represented by the incoming light 320.

The optical transmitter system 128 may comprise a light source, such as a light emitting diode, quantum dot, laser, and so forth. The optical transmitter system 128 also includes one or more devices to modulate and amplify light from the light source to produce outgoing light 852. The optical transmitter system 128 accepts data for transmission during operation.

The outgoing light 852 may pass through one or more lenses 822, mirrors 820, and so forth. The outgoing light 852 may be incident to the dichroic mirror 808 and then subsequently is reflected to the moveable mirror 804. The moveable mirror 804 reflects the outgoing light 852 into the telescope 802. The telescope 802 directs the outgoing light 852 towards the receiving optical transceiver 122, such as in another satellite 102, at a ground station 106, and so forth.

The incoming light 320 is directed by the dichroic mirror 808 towards the optical receiver system 126. In some implementations a filter 830 may be in the optical path. The filter 830 may be used to removed unwanted or undesirable wavelengths of light. The incoming light 320 may pass through a beam splitter 832. In this illustration, the beam splitter 832 is depicted as a cubical beam splitter comprising two triangular prisms. In other implementations other beam splitter designs may be used, such as a half-silvered mirror.

In one implementation the beam splitter 832 may have an incident face 834, a first face 836, and a second face 838. For example, the beam splitter 832 may comprise a cubical beam splitter. The incident face 834 is a portion of the beam splitter 832 upon which the incoming light 320 impinges. The first face 836 comprises a portion of the beam splitter 832 from which a first portion of the incoming light 320 is emitted. For example, the first face 836 may comprise the face from which a reflection of the incoming light 320 is directed. The second face 838 comprises a portion of the beam splitter 832 from which a second portion of the incoming light 320 is emitted. For example, the second face 838 may comprise the face from which the incoming light 320 is transmitted or not otherwise reflected and may be directed towards the optical receiver system 126.

The incoming light 320 emitted from the first face 836 passes into the optical detector system 124. The detector array 316 provides as output one or more output signals 860. For example, each photodetector 306 may provide an output signal 860 having a current that is representative of the power of incident light incident on that photodetector 306.

The output signals 860 may be processed by signal processing electronics 862. The signal processing electronics 862 may comprise electronic circuitry that accept the analog signals from the photodetectors 306 as input and provide as output digital data. For example, the signal processing electronics 862 may comprise one or more of an ammeter, transimpedance amplifier, analog to digital converter (ADC), and so forth. In some implementations the signal processing electronics 862 may include one or more processors. These processors may perform one or more functions, including but not limited to denoising, averaging, and so forth.

The signal processing electronics 862 may provide as output direction data 864 and distance data 866. The direction data 864 may be indicative of a direction of a center of the incoming light 320 with respect to one or more axes and relative to a predetermined point on the detector array 316. For example, the direction data 864 may be indicative of an angle. The distance data 866 may be indicative of a distance of a center of the incoming light 320 with respect to the predetermined point relative to the detector array 316. For example, the distance data 866 may be indicative of a distance in micrometers. In some implementations the direction data 864 and the distance data 866 may be combined.

For example, the output from the signal processing electronics 862 may be indicative of a set of cartesian coordinates with respect to the X and Y axes of the detector array 316. A set of coordinates would thus indicate direction and distance of the first portion 322 or spot relative to an origin of the axes, where the origin coincides with the predetermined point such as a center of the detector array 316.

The output from the signal processing electronics 862 may be provided to a mirror controller 868. For example, the mirror controller 868 may comprise a processor that accepts the direction data 864 and the distance data 866 and determines a magnitude and direction of movement of the moveable mirror 804. The mirror controller 868 may generate as output one or more actuator drive signals 870. The actuator drive signals 870 may then be used to operate the one or more actuators 806. When operated, the actuators 806 move the moveable mirror 804, changing the path of the light incident thereon.

The system may thus operate in a feedback loop, with the output from the optical detector system 124 resulting in the actuator drive signals 870 that may be used to provide tracking. During tracking, the path of the incoming light 320 is changed by the movement of the moveable mirror 804 to maintain the desired alignment of the incoming light 320. This desired alignment may result in the light entering the optical receiver system 126. For example, by aligning the incoming light 320 with respect to the detector array 316 the incoming light 320 is also aligned with respect to the optical input of the optical receiver system 126.

The incoming light 320 emitted from the second face 838 may pass through one or more lenses 840 before entering the optical receiver system 126. The optical receiver system 126 may comprise one or more optical amplifiers, detectors, demodulators, and so forth. During operation, the optical receiver system 126 may provide data as output.

In other implementations other arrangements of the various components of the optical transceiver 122 or a portion thereof may be used. For example, a combination device that operates as a dichroic mirror 808 and beam splitter 832 may be used. In another implementation the filter 830 may be omitted. In some implementations, the optical transmitter system 128 may be omitted and the resulting system is limited to receiving data. In other implementations the optical receiver system 126 may be omitted and the resulting system is limited to transmitting data.

Figure 9:
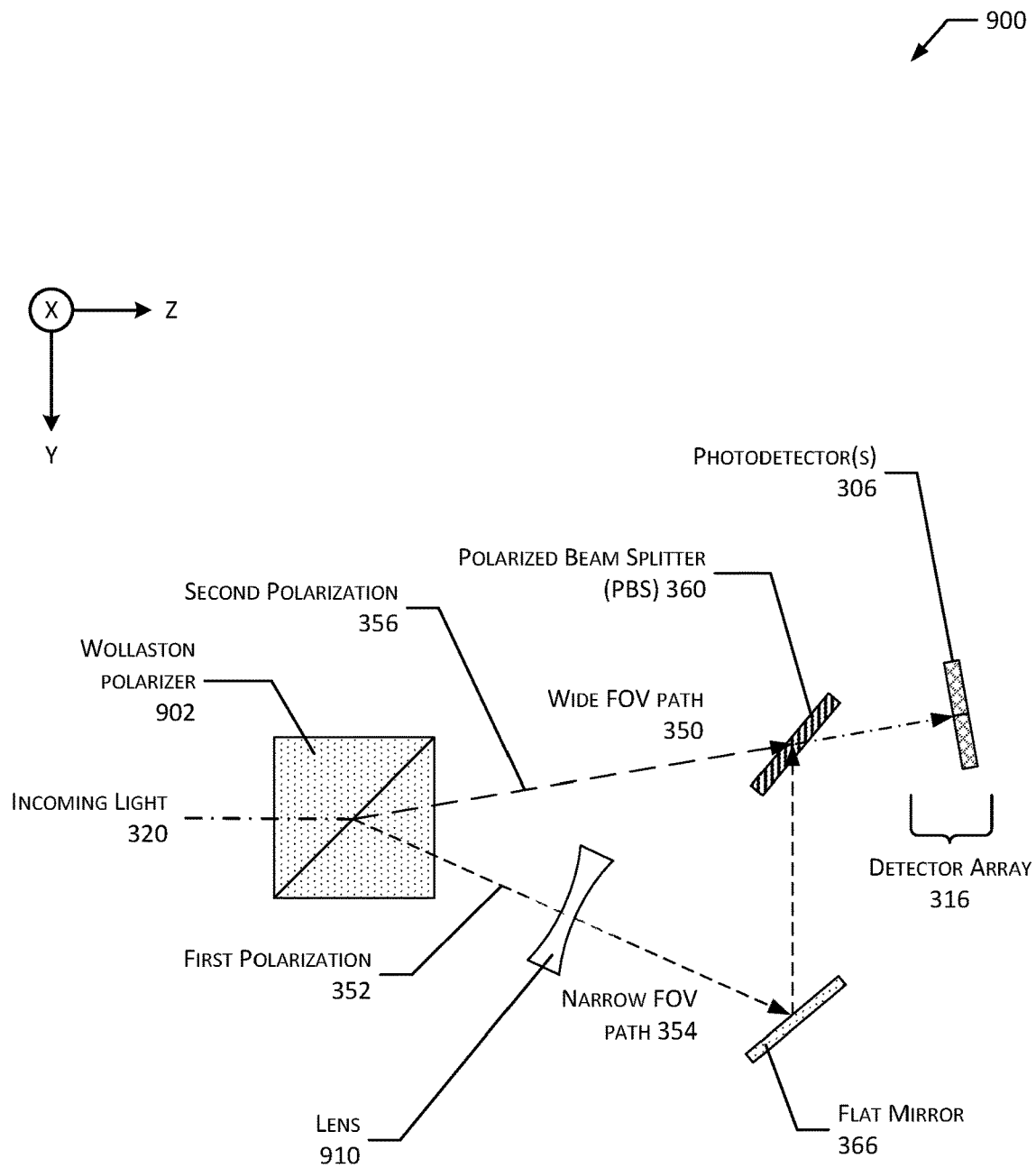
FIG. 9 is a block diagram of a third implementation of the optical detector system having multiple path lengths and a detector array, according to some implementations.

FIG. 9 is a block diagram 900 of a third implementation of the optical detector system 124 having multiple path lengths and a detector array 316, according to some implementations. The different path lengths of light within the optical detector system 124 shown here allow the determination of both wide FOV and narrow FOV information without moving parts, additional detector arrays, and so forth.

In this implementation, the incoming light 320 is incident onto a Wollaston polarizer 902. The Wollaston polarizer 902 may comprise two birefringent right-angle prisms joined such that their optical axes are perpendicular. The prisms may comprise calcite, quartz, and so forth. The Wollaston polarizer 902 accepts the incoming light 320 and causes light with a first polarization 352 to exit the Wollaston polarizer 902 at a first angle and light with a second polarization 956 to exit the Wollaston polarizer 902 at a second angle.

The light with the second polarization 356 that exits the Wollaston polarizer 902 is directed towards a PBS 360. As described above, the light with the second polarization 356 passes through the PBS 360 and impinges on the detector array 316. As a result, in this implementation the portion of the incoming light 320 with the second polarization 356 travels the relatively short wide FOV path 350.

The light with the first polarization 352 that exits the Wollaston polarizer 902 may pass through one or more lenses 910, such as a condenser lens shown here, and impinges on a flat mirror 366. The flat mirror 366 reflects the light with the first polarization 352 towards the PBS 360. The PBS 360 reflects the light with the first polarization 352 towards the detector array 316. As a result, in this implementation the portion of the incoming light with the first polarization 352 travels the relatively long narrow FOV path 354.

In another implementation, the lens 910 may be omitted, and a curved mirror may be used instead of the flat mirror 366.

Figure 10:
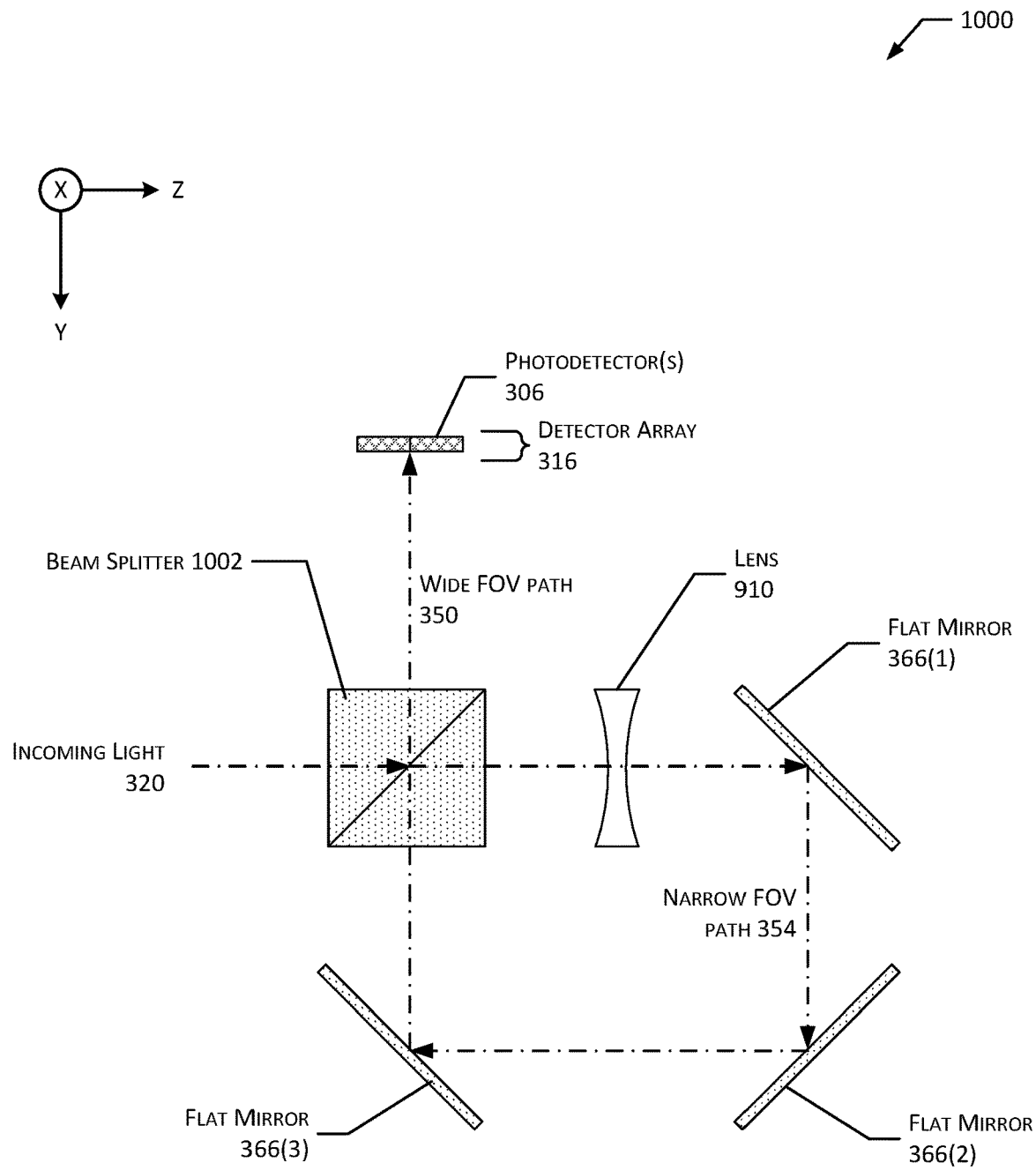
FIG. 10 is a block diagram of a fourth implementation of the optical detector system having multiple path lengths and a detector array, according to some implementations.

FIG. 10 is a block diagram 1000 of a fourth implementation of the optical detector system 124 having multiple path lengths and a detector array 316, according to some implementations. The different path lengths of light within the optical detector system 124 shown here allow the determination of both wide FOV and narrow FOV information without moving parts, additional detector arrays, and so forth.

In this implementation, incoming light 320 is incident on a beam splitter 1002. This may be a non-polarizing beam splitter, or a PBS. A first portion of the incoming light 320 is directed by the beam splitter 1002 towards the detector array 316. As a result, in this implementation the first portion of the incoming light 320 travels the relatively short wide FOV path 350.

A second portion of the incoming light 320 that exits the beam splitter 1002 may pass through one or more lenses 910 and impinges on a first flat mirror 366(1). The first flat mirror 366(1) reflects incident light towards a second flat mirror 366(2). The second flat mirror 366(2) reflects incident light towards a third flat mirror 366(3). The third flat mirror 366(3) reflects incident light towards the beam splitter 1002. At least a portion of the second portion of the incoming light 320, as directed by the flat mirrors 366(1)-(3), passes through the beam splitter 1002 and impinges onto the detector array 316. As a result, in this implementation the second portion of the incoming light 320 travels the relatively long narrow FOV path 354.

In some implementations the one or more lenses 910 may be omitted. In another implementation, the one or more lenses 910 may be omitted, and one or more curved mirrors may be used instead of one or more of the flat mirrors 366.

Figure 11:
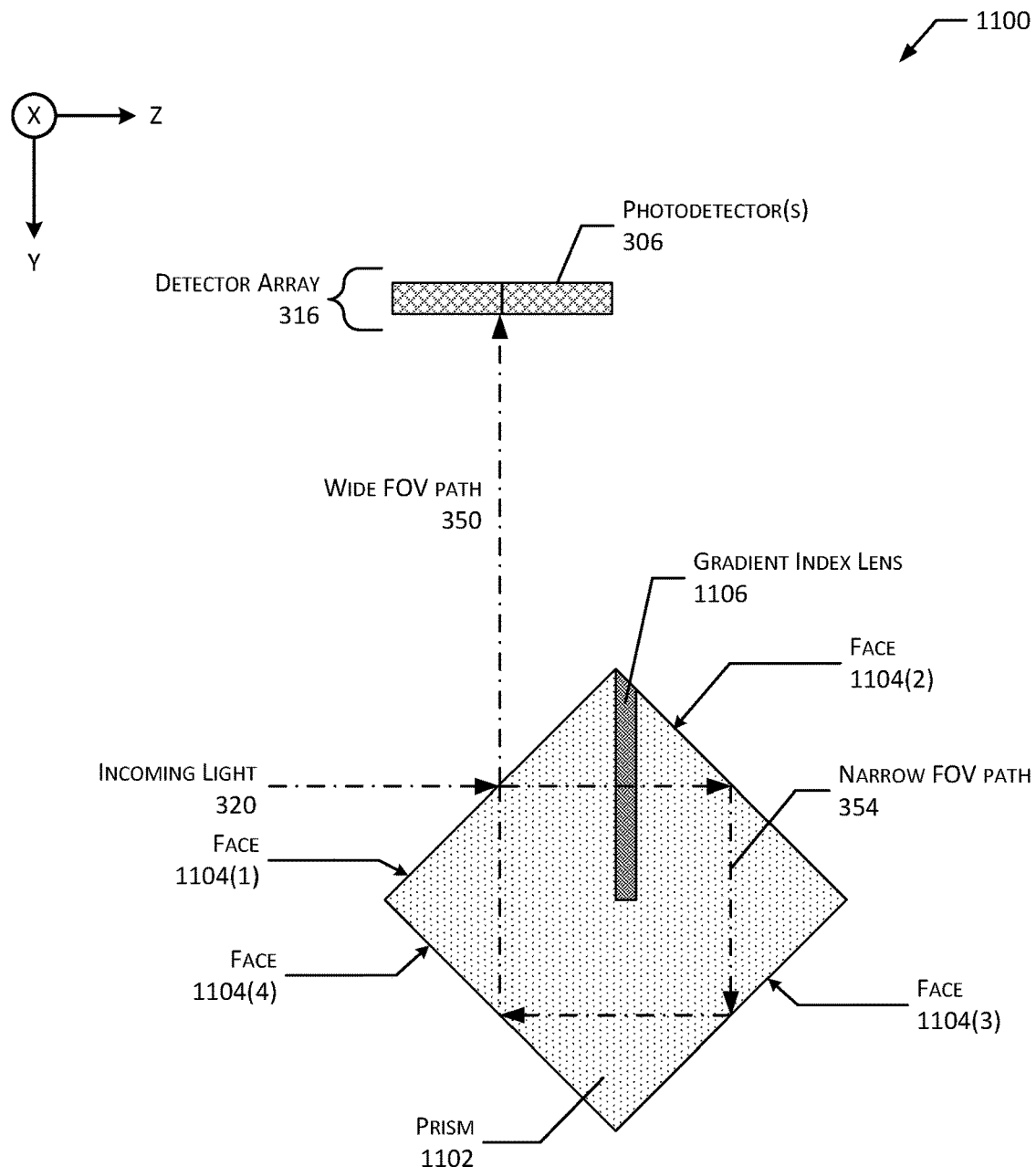
FIG. 11 is a block diagram of a fifth implementation of the optical detector system having multiple path lengths and a detector array, according to some implementations.

FIG. 11 is a block diagram 1100 of a fifth implementation of the optical detector system 124 having multiple path lengths and a detector array 316, according to some implementations. The different path lengths of light within the optical detector system 124 shown here allow the determination of both wide FOV and narrow FOV information without moving parts, additional detector arrays, and so forth.

This implementation comprises a prism 1102 comprising a first face 1104(1), a second face 1104(2), a third face 1104(3), and a fourth face 1104(4). For example, the prism 1102 may comprise a cubical prism. The prism 1102 may comprise a plurality of pieces, or may be a single piece. The prism 1102 may include one or more gradient index lenses 1106. For example, the prism 1102 may comprise various regions with different refractive indices to provide a lensing effect on light. The first face 1104(1) may be half-silvered, while the second face 1104(2), third face 1104(3), and the fourth face 1104(4) may be full silvered.

A first portion of the incoming light 320 impinges on the first face 1104(1) and is reflected towards and impinges on the detector array 316. As a result, in this implementation the first portion of the incoming light 320 travels the relatively short wide FOV path 350.

A second portion of the incoming light 320 enters the prism 1102 and may pass through one or more of the gradient index lenses 1106. The second portion of the incoming light 320 impinges on an interior portion of the second face 1104(2) and is reflected towards an interior portion of the third face 1104(3) that in turn reflects the second portion of the incoming light 320 towards the fourth face 1104(4). The fourth face 1104(4) in turn reflects at least a portion of the second portion of the incoming light 320 through the first face 1104(1) and towards the detector array 316. For example, the interior portions of the second face 1104(2), the third face 1104(3), and the fourth face 1104(4) may act as mirrors. The mirrors may be due to internal reflection, application of material to an exterior portion of the face 1104, and so forth. As a result, in this implementation the second portion of the incoming light 320 travels the relatively long narrow FOV path 354.

In another implementation, the gradient index lens 1106 may be omitted and one or more of the faces 1104 may act as a curved mirror.

In other implementations, other configurations or combinations of configurations may be used. For example, the first implementation depicted in FIG. 3 may be combined with the fifth implementation depicted in FIG. 11 to increase the length of the narrow FOV path 354.

The circuitry, processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a first lens that directs incoming light onto a first surface of a polarized beam splitter (PBS);
    the PBS that directs:
        a first portion of the incoming light having a first polarization from the first surface of the PBS to a detector array, wherein a first path of the first portion of the incoming light from the first lens to the detector array has a first length, and
        a second portion of the incoming light having a second polarization through the first surface of the PBS to a first quarter wave retarder (QWR);
    the first QWR that:
        changes a polarization of the second portion of the incoming light from the second polarization to a first intermediate polarization, and
        directs the second portion of the incoming light having the first intermediate polarization to a convex mirror;
    the convex mirror that reflects the second portion of the incoming light having the first intermediate polarization back to the first QWR;
    the first QWR that:
        changes a polarization of the second portion of the incoming light from the first intermediate polarization to the first polarization, and
        directs the second portion of the incoming light having the first polarization onto a second surface of the PBS;
    the PBS that directs the second portion of the incoming light having the first polarization from the second surface of the PBS to a second QWR;
    the second QWR that:
        changes a polarization of the second portion of the incoming light from the first polarization to a second intermediate polarization, and
        directs the second portion of the incoming light having the second intermediate polarization to a flat mirror;
    the flat mirror that reflects the second portion of the incoming light having the second intermediate polarization back to the second QWR;
    the second QWR that:
        changes a polarization of the second portion of the incoming light from the second intermediate polarization to the second polarization, and
        directs the second portion of the incoming light having the second polarization onto the second surface of the PBS;
    the PBS that directs the second portion of the incoming light having the second polarization through the second surface of the PBS onto the detector array, wherein a second path of the second portion of the incoming light from the first lens to the detector array has a second length that is greater than the first length; and
    the detector array that determines first output, the detector array comprising:
        a first photodetector,
        a second photodetector,
        a third photodetector, and
        a fourth photodetector.

2. The system of claim 1, wherein:
    the PBS comprises a cube having:
        a first face that receives the first portion of the incoming light and the second portion of the incoming light,
        a second face that is proximate to the detector array that receives the first portion of the incoming light having the first polarization and outputs the first portion of the incoming light having the first polarization towards the detector array and that further receives the second portion of the incoming light having the second polarization and outputs the second portion of the incoming light having the second polarization towards the detector array,
        a third face that is opposite the first face that receives the second portion of the incoming light having the second polarization and outputs the second portion of the incoming light having the first polarization towards the second surface of the PBS, and
        a fourth face that is opposite the second face that receives the second portion of the incoming light having the first polarization and outputs the second portion of the incoming light having the second polarization towards the second surface of the PBS;
    the first QWR and the convex mirror are affixed to, or integral with, the third face; and
    the second QWR and the flat mirror are affixed to, or integral with, the fourth face.

3. The system of claim 1, further comprising electronic circuitry to:
    determine, based on first output from the first photodetector, second output from the second photodetector, third output from the third photodetector, and fourth output from the fourth photodetector:
        first data indicative of a direction of incoming light relative to a predetermined point on the detector array; and
        second data indicative of a distance between the incoming light and the predetermined point.

4. A system comprising:
    a first lens that directs incoming light onto a first surface of a polarized beam splitter (PBS);
    the PBS that directs:
        a first portion of the incoming light having a first polarization from the first surface of the PBS to a detector array, wherein a first path of the first portion of the incoming light from the first lens to the detector array has a first length, and a second portion of the incoming light having a second polarization through the first surface of the PBS to a first quarter wave retarder (QWR);

the first QWR that:
changes a polarization of the second portion of the incoming light from the second polarization to a first intermediate polarization, and
directs the second portion of the incoming light having the first intermediate polarization to a convex mirror;

the convex mirror that reflects the second portion of the incoming light having the first intermediate polarization back to the first QWR;

the first QWR that:
changes a polarization of the second portion of the incoming light from the first intermediate polarization to the first polarization, and
directs the second portion of the incoming light having the first polarization onto a second surface of the PBS;

the PBS that directs the second portion of the incoming light having the first polarization from the second surface of the PBS to a second QWR;

the second QWR that:
changes a polarization of the second portion of the incoming light from the first polarization to a second intermediate polarization, and
directs the second portion of the incoming light having the second intermediate polarization to a flat mirror;

the flat mirror that reflects the second portion of the incoming light having the second intermediate polarization back to the second QWR;

the second QWR that:
changes a polarization of the second portion of the incoming light from the second intermediate polarization to the second polarization, and
directs the second portion of the incoming light having the second polarization onto the second surface of the PBS;

the PBS that directs the second portion of the incoming light having the second polarization through the second surface of the PBS onto the detector array, wherein a second path of the second portion of the incoming light from the first lens to the detector array has a second length that is greater than the first length; and the detector array comprising a plurality of photodetectors.

5. The system of claim 4, wherein:
the second path extends:
from the PBS to the convex mirror through the first QWR,
from the convex mirror to the PBS through the first QWR,
from the PBS to the flat mirror through the second QWR, and
from the flat mirror to the detector array through the second QWR and the PBS.

6. The system of claim 4, wherein the PBS is concave having a concavity facing the detector array.

7. The system of claim 4, further comprising:
a dispersive element that is between the PBS and the detector array, wherein the dispersive element comprises one or more of:
one or more diffractive elements,
one or more diffusive elements,
one or more lenses, or
a microlens array.

8. The system of claim 4, the plurality of photodetectors comprising:
a first photodetector,
a second photodetector,
a third photodetector, and
a fourth photodetector; and
wherein the first photodetector, the second photodetector, the third photodetector, and the fourth photodetector are arranged in a two-dimensional array.

9. The system of claim 4, further comprising:
electronic circuitry connected to individual ones of the plurality of photodetectors, wherein the electronic circuitry generates output indicative of an intensity of light incident on the individual ones of the plurality of photodetectors.

10. The system of claim 4, further comprising electronic circuitry to:
determine, based on output from the plurality of photodetectors:
first data indicative of a direction of incoming light relative to a predetermined point on the detector array; and
second data indicative of a distance between the incoming light and the predetermined point.

11. The system of claim 4, further comprising:
a third mirror;
one or more actuators, wherein the one or more actuators operate to move the third mirror; and
electronic circuitry to:
operate the one or more actuators based on output from the plurality of photodetectors.

12. The system of claim 4, wherein a mutual distance between the PBS and each of:
the detector array, the first QWR, the convex mirror, the second QWR, and the flat mirror is fixed.

13. The system of claim 4, wherein:
the PBS comprises a cube having:
a first face that receives the first portion of the incoming light and the second portion of the incoming light,
a second face that is proximate to the detector array,
a third face that is opposite the first face, and
a fourth face that is opposite the second face;
the first QWR and the convex mirror are affixed to, or integral with, the third face; and
the second QWR and the flat mirror are affixed to, or integral with, the fourth face.

14. A method comprising:
directing, using a first lens, incoming light onto a first surface of a polarized beam splitter (PBS);
directing, using the PBS:
a first portion of the incoming light having a first polarization from the first surface of the PBS to a detector array, wherein a first path of the first portion of the incoming light from the first lens to the detector array has a first length, and
a second portion of the incoming light having a second polarization through the first surface of the PBS to a first quarter wave retarder (QWR);
changing, at the first QWR, a polarization of the second portion of the incoming light from the second polarization to a first intermediate polarization;
directing, using the first QWR, the second portion of the incoming light having the first intermediate polarization to a convex mirror;
reflecting, at the convex mirror, the second portion of the incoming light having the first intermediate polarization back to the first QWR;

changing, at the first QWR, a polarization of the second portion of the incoming light from the first intermediate polarization to the first polarization;
directing, using the first QWR, the second portion of the incoming light having the first polarization onto a second surface of the PBS;
directing, using the PBS, the second portion of the incoming light having the first polarization from the second surface of the PBS to a second QWR;
changing, at the second QWR, a polarization of the second portion of the incoming light from the first polarization to a second intermediate polarization;
directing, using the second QWR, the second portion of the incoming light having the second intermediate polarization to a flat mirror;
reflecting, using the flat mirror, the second portion of the incoming light having the second intermediate polarization back to the second QWR;
changing, at the second QWR, a polarization of the second portion of the incoming light from the second intermediate polarization to the second polarization;
directing, using the second QWR, the second portion of the incoming light having the second polarization onto the second surface of the PBS;
directing, using the PBS, the second portion of the incoming light having the second polarization through the second surface of the PBS onto the detector array, wherein a second path of the second portion of the incoming light from the first lens to the detector array has a second length that is greater than the first length;
determining first output of the detector array; and
determining, based on the first output, first data indicative of a direction of incoming light relative to a predetermined point on the detector array.

15. The method of claim 14, further comprising:
operating one or more actuators of a fast steering mirror based at least in part on the first data.

16. The method of claim 14, further comprising:
dispersing at least a portion of one or more of the first portion of the incoming light or the second portion of the incoming light that impinges onto the detector array using one or more of:
one or more diffractive elements,
one or more diffusive elements,
one or more lenses, or
a microlens array.

17. The system of claim 13, wherein the first lens is affixed to, or integral with, the first face.

18. The system of claim 13, further comprising:
a dispersive element, wherein the dispersive element is affixed to, or integral with, the second face.

19. The system of claim 13, wherein the detector array is affixed to, or integral with, the second face.

20. The method of claim 14, further comprising:
determining, based on the first output, second data indicative of a distance between the incoming light and the predetermined point; and
operating one or more actuators of a fast steering mirror based at least in part on the first data and the second data.

* * * * *

UNITED STATES PATENT AND TRADEMARK OFFICE
CERTIFICATE OF CORRECTION

| | | |
|---|---|---|
| PATENT NO. | : 12,032,079 B1 | Page 1 of 1 |
| APPLICATION NO. | : 17/114923 | |
| DATED | : July 9, 2024 | |
| INVENTOR(S) | : Rui Zhang et al. | |

It is certified that error appears in the above-identified patent and that said Letters Patent is hereby corrected as shown below:

On the Title Page

Please add Missing Reference under "(56) References Cited":
--WO 2004085670 Oleksy et al.--

Signed and Sealed this
Twenty-sixth Day of November, 2024

Katherine Kelly Vidal
*Director of the United States Patent and Trademark Office*